US012767352B2

(12) United States Patent
Chung

(10) Patent No.: US 12,767,352 B2
(45) Date of Patent: Oct. 20, 2026

(54) ELECTROMAGNETIC FORCE AND VERTIPORT FOR THE SAME

(71) Applicants: Hyundai Motor Company, Seoul (KR); Kia Corporation, Seoul (KR)

(72) Inventor: Jae Hoon Chung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 246 days.

(21) Appl. No.: 18/624,344

(22) Filed: Apr. 2, 2024

(65) Prior Publication Data

US 2025/0178746 A1 Jun. 5, 2025

(30) Foreign Application Priority Data

Dec. 5, 2023 (KR) ........................ 10-2023-0174560

(51) Int. Cl.

| | |
|---|---|
| ***B64F 1/12*** | (2006.01) |
| ***B64F 1/02*** | (2006.01) |
| ***B64F 1/22*** | (2006.01) |
| ***B64F 1/35*** | (2024.01) |
| ***B64U 70/99*** | (2023.01) |
| *B64G 1/64* | (2006.01) |
| *G05D 1/654* | (2024.01) |
| *G05D 1/661* | (2024.01) |

(52) U.S. Cl.

CPC .................. *B64F 1/22* (2013.01); *B64F 1/02* (2013.01); *B64F 1/35* (2024.01); *B64G 1/646* (2013.01); *G05D 1/654* (2024.01); *G05D 1/661* (2024.01)

(58) Field of Classification Search

CPC .... B64G 1/6464; B64G 1/6462; B64G 1/646; B64F 1/22; B64F 1/02; G05D 1/661

See application file for complete search history.

(56) References Cited

U.S. PATENT DOCUMENTS

| | | | | |
|---|---|---|---|---|
| 11,338,911 B2 * | 5/2022 | Wong | B64C 25/68 |
| 12,183,940 B2 * | 12/2024 | Bell | B60H 1/00264 |
| 12,358,661 B2 * | 7/2025 | Hirai | B64F 1/24 |
| 2006/0145023 A1 * | 7/2006 | Babb | B64G 1/6462 244/172.4 |
| 2018/0079531 A1 * | 3/2018 | Bennett | B60L 53/36 |
| 2021/0229806 A1 | 7/2021 | Kanda | |

FOREIGN PATENT DOCUMENTS

| | | | | |
|---|---|---|---|---|
| CN | 120503993 A * | 8/2025 | B60P 3/11 |
| JP | H06144395 A | 5/1994 | |
| JP | 3155974 U | 12/2009 | |
| JP | 3160207 U | 6/2010 | |
| KR | 20090041888 A | 4/2009 | |
| KR | 20100133810 A | 12/2010 | |
| KR | 101688420 B1 | 12/2016 | |
| KR | 20230033364 A * | 3/2023 | B64F 1/22 |
| KR | 102613926 B1 * | 12/2023 | G01C 21/08 |

* cited by examiner

*Primary Examiner* — Brian M O'Hara

(74) *Attorney, Agent, or Firm* — Slater Matsil, LLP

(57) ABSTRACT

A vertiport includes a main body, an elevating device configured to move up and down with respect to the main body, a take-off and landing portion disposed on an upper portion of the elevating device, wherein the take-off and landing portion is configured to operate to allow an aircraft equipped with a magnet unit in a lower portion of a fuselage to take off, land, and move, and a coil unit disposed in the take-off and landing portion and configured to interact electromagnetically with the magnet unit of the aircraft.

19 Claims, 5 Drawing Sheets

ELECTROMAGNETIC FORCE AND VERTIPORT FOR THE SAME

CROSS-REFERENCE TO RELATED APPLICATIONS

This application claims the benefit of Korean Patent Application No. 10-2023-0174560, filed on Dec. 5, 2023, which application is hereby incorporated herein by reference in its entirety.

TECHNICAL FIELD

The present disclosure relates to an aircraft landing method based on electromagnetic force and a vertiport for the same.

BACKGROUND

Recently, an urban air mobility (UAM) for future transportation and traffic service systems is being developed. A UAM may be an aircraft capable of vertical take-off and landing flights, and, along with the development of the UAM, the development of a vertiport, a take-off and landing site where the UAM can take off and land, is required.

A vertiport has infrastructure or systems with support services and equipment for landing, ground handling, and take-off of manned or unmanned vertical take-off and landing (VTOL) aircraft. The vertiport is generally considered to be installed on rooftops of high-rise buildings or large parks. The vertiport may have a smaller footprint with smaller landing and take-off regions, as compared to typical airports having typical runways.

In a vertical take-off and landing aircraft, there may be a risk of damage to a fuselage due to significant impacts being applied to the aircraft in a process of taking off and landing vertically on a vertiport.

SUMMARY

An embodiment of the present disclosure provides an aircraft landing method capable of aligning a landing position of an aircraft using electromagnetic force and alleviating impacts during landing and a vertiport for the same.

According to an embodiment of the present disclosure, a vertiport may include a main body, an elevating device provided to move up and down with respect to the main body, a take-off and landing portion disposed on an upper portion of the elevating device so that an aircraft equipped with a magnet unit in a lower portion of a fuselage takes off and lands, wherein the take-off and landing portion moves by an operation of the elevating device, and a coil unit provided in the take-off and landing portion to interact electromagnetically with the magnet unit of the aircraft.

In an embodiment, the coil unit may include a plurality of coils, and the plurality of coils may be disposed in a position corresponding to a plurality of permanent magnets included in the magnet unit.

In an embodiment, the plurality of coils may include a central coil disposed in a center of the coil unit and a peripheral coil surrounding the central coil, the central coil may correspond to a central magnet among the plurality of permanent magnets, and the peripheral coil may correspond to a peripheral magnet among the plurality of permanent magnets.

In an embodiment, the coil unit may further include a coil support member to which the plurality of coils are coupled, and the central coil may be disposed in a center of the coil support member.

In an embodiment, the peripheral coil may be provided in a form in which a plurality of electromagnetic coils are disposed in a circular shape to surround the central coil.

In an embodiment, the peripheral magnet may be provided in a form in which a plurality of magnets surround the central magnet in response to a form in which the peripheral coil is disposed.

In an embodiment, the coil unit may be provided so that in a process of landing the aircraft on the take-off and landing portion, the coil unit is disposed to face the magnet unit disposed in a lower portion of the fuselage, and electromagnetic force acts between the coil unit and the magnet unit.

In an embodiment, the vertiport may further include a controller provided in the main body or the elevating device to apply a current to the plurality of coils, wherein the controller may be set to control a direction and intensity of a current flowing through the plurality of coils.

In an embodiment, repulsive force or attractive force may be generated based on the direction of the current flowing through the plurality of coils, between the plurality of coils and the plurality of permanent magnets corresponding to each other, and a net force of attractive force and repulsive force generated between each of the plurality of coils and the plurality of permanent magnets may act between the coil unit of the take-off and landing portion and the magnet unit of the aircraft.

In an embodiment, the controller may be configured to control a current applied to the plurality of coils so that attractive force is generated between some of the plurality of coils and the plurality of permanent magnets corresponding to each other, and repulsive force is generated between the others of the plurality of coils and the plurality of permanent magnets.

In an embodiment, based on the attractive force generated between some of the plurality of coils and the plurality of permanent magnets, the aircraft may be aligned with an upper portion of a landing position of the take-off and landing portion.

In an embodiment, based on the repulsive force generated between the others of the plurality of coils and the plurality of permanent magnets, impacts applied to the aircraft may be absorbed in a process of settling the aircraft on the take-off and landing portion.

In an embodiment, the controller may be configured to apply a current so that attractive force is generated between the central coil and the central magnet, and repulsive force may be generated between at least one portion of the peripheral coil and at least one portion of the peripheral magnet.

In an embodiment, the controller may be configured to apply a current so that in a state in which the aircraft is aligned with a landing position of the take-off and landing portion, a net force of electromagnetic force acting between the coil unit and the magnet unit is converted from a repulsive force to an attractive force, and the aircraft may be settled in the take-off and landing portion by the attractive force.

In an embodiment, the vertiport may further include a fastening structure provided on the take-off and landing portion and mechanically fastened to the aircraft, wherein the aircraft can be charged through fastening with the fastening structure.

According to an embodiment of the present disclosure, an aircraft landing method may include allowing an aircraft to approach a vertiport equipped with a take-off and landing portion, elevating the take-off and landing portion by driving an elevating device provided in the vertiport, aligning the aircraft based on electromagnetic force between the magnet unit provided in the aircraft and the coil unit provided in the take-off and landing portion, settling and fastening the aircraft to the take-off and landing portion based on the electromagnetic force between the magnet unit and the coil unit, and lowering the take-off and landing portion by driving the elevating device.

In an embodiment, the magnet unit may include a plurality of permanent magnets, and the coil unit may include a plurality of coils corresponding to the plurality of permanent magnets, a repulsive force or an attractive force may be generated based on a direction of a current flowing through the plurality of coils between the plurality of coils and the plurality of permanent magnets corresponding to each other, and a net force of the attractive force and the repulsive force generated between each of the plurality of coils and the plurality of permanent magnets may act between the coil unit and the magnet unit.

In an embodiment, in the elevating the take-off and landing portion, an application of a current to at least some of the plurality of coils may be controlled so that repulsive force acts between the magnet unit and the elevating device.

In an embodiment, in aligning the aircraft, a repulsive force may act between the magnet unit and the elevating device, but an application of a current may be controlled to generate an attractive force between some of the plurality of coils and the plurality of permanent magnets corresponding to each other, and the aircraft may be aligned with a landing position of the take-off and landing portion based on the attractive force between some of the coils and some of the permanent magnets.

In an embodiment, in the settling and fastening the aircraft to the take-off and landing portion, an application of a current may be controlled so that net force of electromagnetic force acting between the magnet unit and the coil unit is converted from repulsive force to attractive force, and the aircraft may be settled on the take-off and landing portion while the magnet unit is pulled to the coil unit.

According to an embodiment of the present disclosure, it may be possible to alleviate or minimize impacts generated during vertical take-off and landing of an aircraft by adjusting a repulsive force and an attractive force of an electromagnetic force.

According to an embodiment of the present disclosure, an aircraft may be stably fixed by fastening the aircraft in a mechanical fastening structure in addition to an electromagnetic force, and the efficiency of the aircraft operation may be increased by charging the aircraft simultaneously with fastening the aircraft.

BRIEF DESCRIPTION OF THE DRAWINGS

The above and other aspects, features, and advantages of embodiments of the present disclosure will be more clearly understood from the following detailed description, taken in conjunction with the accompanying drawings, in which.

DETAILED DESCRIPTION OF ILLUSTRATIVE EMBODIMENTS

Figure 1:
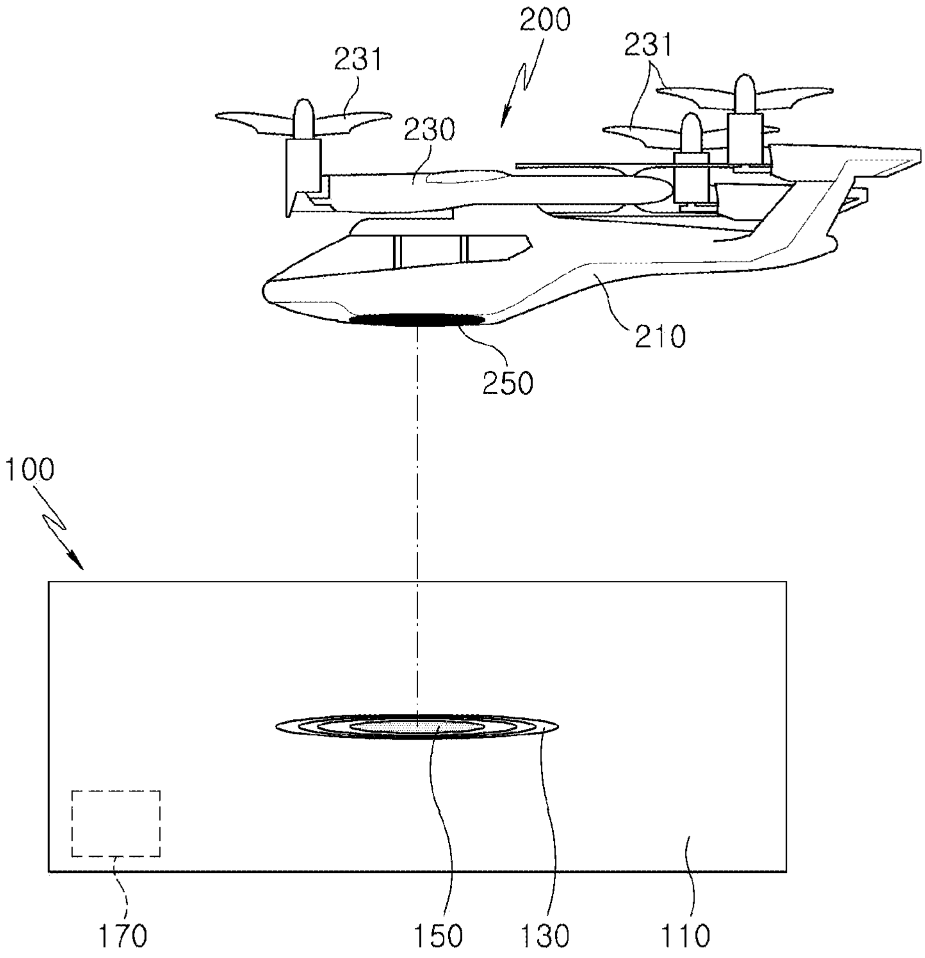
FIG. 1 illustrates a vertiport and an aircraft taking off and landing on the vertiport according to an embodiment of the present disclosure.

Hereinafter, the present disclosure may make various changes and have various embodiments, and specific embodiments thereof will be described and illustrated in the drawings. However, the embodiments are not intended for limiting the invention. The idea of the present disclosure should be construed to extend to any alterations, equivalents, and substitutes besides the accompanying drawings.

It will be understood that although the terms first, second, etc., may be used herein to describe various elements, these elements should not be limited by these terms. These terms are generally only used to distinguish one element from another. For example, a first element could be termed a second element, and, similarly, a second element could be termed a first element, without departing from the scope of the present disclosure. The term "and/or" encompasses a combination of plural items or any one of the plural items.

The terms used herein are for the purpose of describing particular embodiments only and are not intended to be limiting of the present disclosure. The singular also includes the plural unless specifically stated otherwise in the phrase. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which example embodiments of the present disclosure belong. It will be further understood that the terms, such as those defined in commonly used dictionaries, should be interpreted as having meanings that are consistent with their meanings in the context of the relevant art and will not be interpreted in an idealized or overly formal sense unless expressly so defined herein.

In the present specification, an aircraft may refer to a mobility vehicle configured to fly and move over the air. In other words, the aircraft may refer to a rotorcraft, a drone, a tilt rotor aircraft, a fixed-wing aircraft, and the like, and it may also include a vehicle that may taxi on the ground using wheels and fly with the wheels separated from the ground. The aircraft may also include a manned aircraft and an unmanned aircraft. The manned aircraft may include a fuselage that can operate by autonomous flight in addition to a fuselage controlled by a pilot.

Hereinafter, embodiments of the present disclosure will be described with reference to the drawings.

Figure 2:
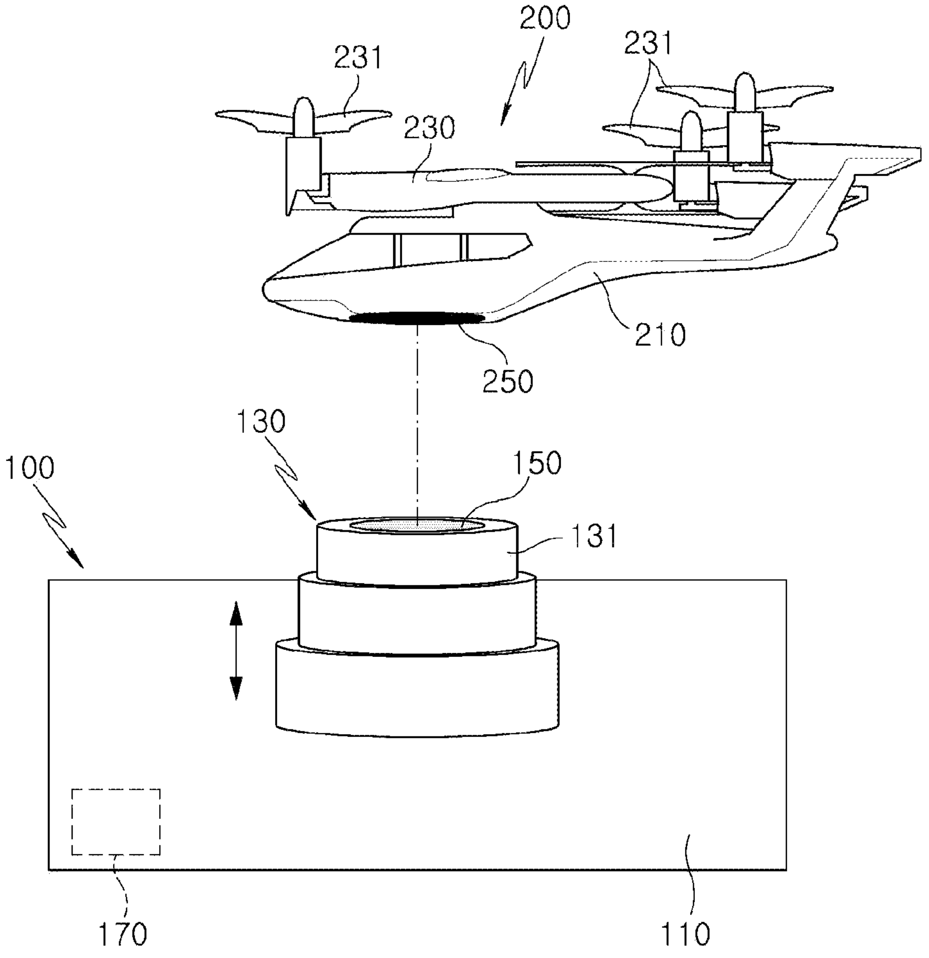
FIG. 2 illustrates a vertiport and an aircraft taking off and landing on the vertiport according to an embodiment of the present disclosure.
Figure 3:
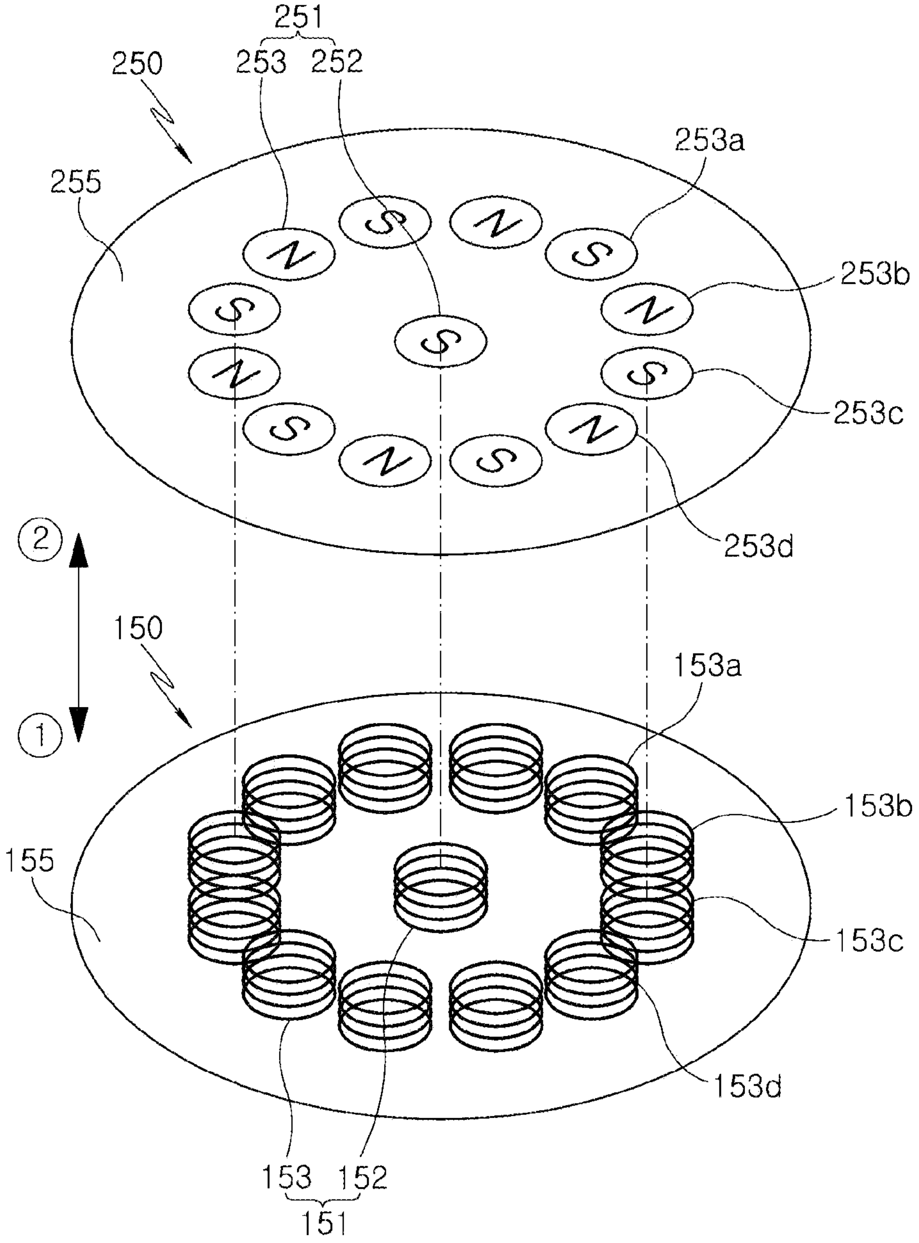
FIG. 3 illustrates a coil unit of a vertiport and a magnet unit of the aircraft illustrated in FIGS. 1 and 2.
Figure 4:
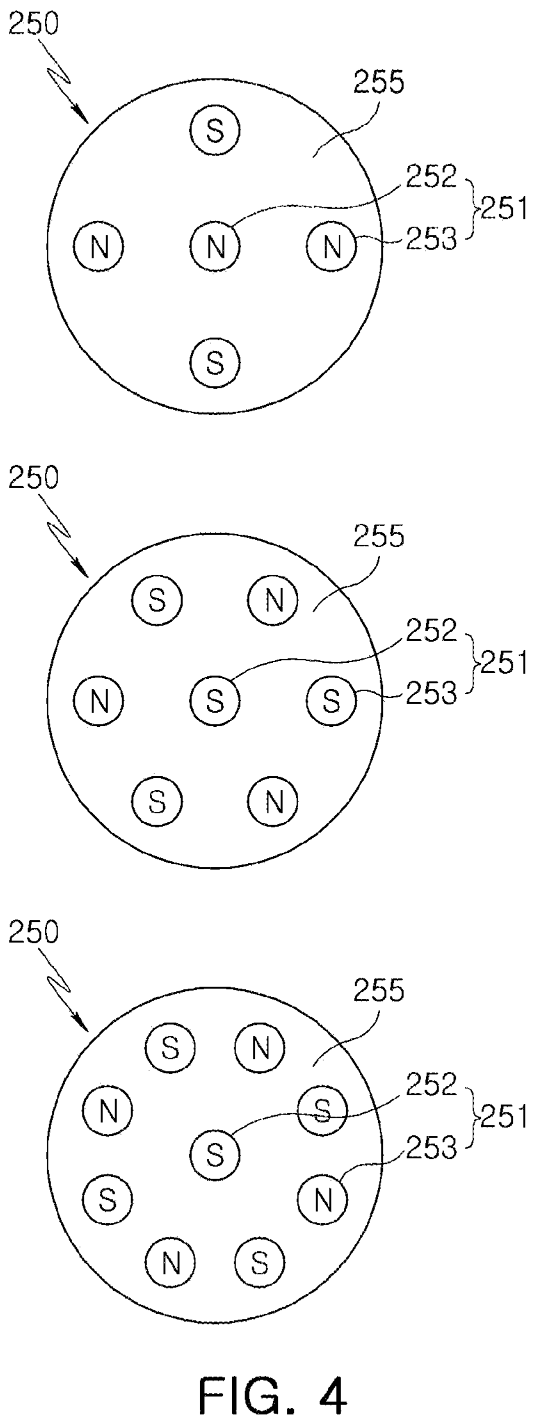
FIG. 4 illustrates various modified examples of the magnet unit of the aircraft illustrated in FIG. 3.

FIG. 1 illustrates a vertiport 100 and an aircraft 200 taking off and landing on the vertiport 100 according to an embodiment of the present disclosure. FIG. 2 illustrates a vertiport 100 and an aircraft 200 taking off and landing on the vertiport 100 according to an embodiment of the present disclosure. FIG. 3 illustrates a coil unit 150 of the vertiport 100 and a magnet unit 250 of the aircraft 200 illustrated in FIGS. 1 and 2. FIG. 4 illustrates various modified examples to the magnet unit 250 of the aircraft 200 illustrated in FIG. 3.

FIGS. 1 and 2 schematically illustrate the vertiport 100 according to an embodiment. FIG. 1 illustrates the vertiport 100 before an elevating device 130 moves up, and FIG. 2 illustrates the vertiport 100 after the elevating device 130 moves up.

FIG. 3 illustrates a detailed configuration of the coil unit 150 and the magnet unit 250 of FIGS. 1 and 2. FIG. 4 illustrates various arrangements of a plurality of permanent magnets 251 in the magnet unit 250 of FIG. 3.

The vertiport 100 according to an embodiment is a take-off and landing site (e.g., a take-off and landing airfield or station) for the aircraft 200 capable of vertical take-off and landing (VTOL), and it may include infrastructure configured to receive an aircraft from a flight, reset the aircraft for a subsequent flight, and allow the aircraft to depart for a subsequent flight. Here, the aircraft 200 may be an air mobility including an urban air mobility (UAM) or an advanced air mobility (AAM), and the type of aircraft 200 is not particularly limited.

The vertiport 100 refers to ground infrastructure for take-off, landing, charging, or maintenance of a vertical take-off and landing aircraft, and it may be understood as including Verti-hub, Verti-port, or Verti-stop, classified according to size.

For example, the Verti-hub is the largest UAM take-off and landing site, and it may enable large-scale transfer of surrounding traffic of airports or the like, may have support infrastructure such as charging and maintenance, and may accommodate multiple UAM vehicles after their operation ends. The Verti-port is a smaller take-off and landing site than the Verti-hub, and it may have a vehicle support infrastructure (charging, maintenance, etc.) and may also provide passenger convenience facilities. The Verti-stop (or a Verti-station) is smaller than the Verti-port and is a small take-off and landing site with one or two aprons.

Referring to FIGS. 1 to 3, the vertiport 100 according to an embodiment may include a main body 110, the elevating device 130, and a controller 170.

The main body 110 may be provided to allow the aircraft 200 to take off or land, stop, or move. The elevating device 130 may be disposed in a partial region of the main body 110, and the main body 110 may be provided to support an elevating operation of the elevating device 130.

FIGS. 1 and 2 schematically illustrate the vertiport 100. Although not illustrated in FIGS. 1 and 2, the main body 110 may be equipped with a configuration and/or auxiliary facilities for take-off, landing, stopping, maintenance, charging, and a movement of the aircraft 200.

The elevating device 130 may be disposed on the main body 110 and at least a portion thereof may be configured to move up or down with respect to the main body 110. The elevating device 130 may include a take-off and landing portion 131 on which the aircraft 200 takes off and lands. For example, the elevating device 130 may be provided to elevate the take-off and landing portion 131 from the main body 110 or to lower the take-off and landing portion 131 toward the main body 110. Although not illustrated, the main body 110 may be provided with a driver (e.g., a motor or an actuator) that provides driving force to elevate or lower the elevating device 130. The take-off and landing portion 131 may be referred to as a take-off and landing section, a take-off and landing area, a take-off and landing plate, or a take-off and landing platform provided in a portion of the elevating device 130.

According to the embodiment illustrated in FIGS. 1 and 2, the elevating device 130 may include a telescopic lift capable of adjusting a height of the take-off and landing portion 131 using a telescopic structure. However, the structure of the elevating device 130 is not limited to the illustrated embodiment, and it may be provided in various forms capable of elevating or lowering the take-off and landing portion 131. For example, the elevating device 130 may be provided to adjust the height of the take-off and landing portion 131 using various lifts, including a scissor lift or a screw lift.

The vertiport 100 according to an embodiment of the present disclosure may be configured to prevent hard landing from occurring during the landing of the aircraft 200, to generate an electromagnetic force (or an electromagnetic interaction) between the take-off and landing portion 131 of the elevating device 130 and the aircraft 200 to alleviate or minimize impacts acting on the aircraft 200, and to control the electromagnetic forces.

The elevating device 130 may include a coil unit 150. The coil unit 150 may be disposed in the take-off and landing portion 131 of the elevating device 130. The coil unit 150 may be installed in a partial region of the take-off and landing portion 131 in a form or structure capable of electromagnetic interaction with the magnet unit 250 provided in the aircraft 200. For example, the coil unit 150 may electromagnetically interact with the magnet unit 250 installed in the aircraft 200, and it may be installed on the take-off and landing portion 131 to enable an attractive force and/or a repulsive force to be generated between the magnet unit 250 (i.e., the aircraft 200) and the coil unit 150 (i.e., the take-off and landing portion 131).

The coil unit 150 may include a plurality of coils 151. The plurality of coils 151 may be used as electromagnets that form a magnetic field as current is applied. For example, the plurality of coils 151 may not form a magnetic field when no current is applied, but it may form a magnetic field when a current is applied.

The plurality of coils 151 may include a solenoid. For example, the plurality of coils 151 may be solenoid-shaped electromagnets formed by winding a coil around a cylindrical iron core, but the embodiments of the present disclosure are not limited thereto.

The plurality of coils 151 may be provided in a number and shape corresponding to a plurality of permanent magnets 251 included in the magnet unit 250 of the aircraft 200. For example, the plurality of coils 151 may be provided in the same number as the plurality of permanent magnets 251 so that the plurality of coils 151 may be matched 1:1 with the plurality of permanent magnets 251, and the plurality of coils 151 may be disposed in the same shape as a shape in which the plurality of permanent magnets 251 are disposed.

The plurality of coils 151 may include a central coil 152 disposed in a center of the coil unit 150 and a peripheral coil 153 surrounding the central coil 152. The peripheral coil 153 may be provided in a form in which a plurality of coils are disposed in a circumferential direction to surround the central coil 152. The central coil 152 may correspond to a central magnet 252 of the magnet unit 250, and the peripheral coil 153 may correspond to a peripheral magnet 253 of the magnet unit 250.

In the plurality of coils 151, a direction of the magnetic field may be determined depending on a direction in which a current is applied. The plurality of coils 151 may selectively generate an attractive force and a repulsive force between the plurality of permanent magnets 251 matched to each of the plurality of coils 151 by changing a direction of a magnetic field based on the direction in which the current flows. For example, in a case in which the attractive force acts between the permanent magnet 251 and the coil 151 as the current flows clockwise in the coil 151, when a direction of the current flowing through the coil 151 is changed counterclockwise, the repulsive force acts between the permanent magnet 251 and the coil 151. That is, the vertiport 100 according to an embodiment of the present disclosure may be configured to control a direction and intensity of the current flowing in the plurality of coils 151 of the coil unit 150, thus adjusting a direction (e.g., an attractive force or a repulsive force) and a magnitude of force acting on the plurality of permanent magnets 251 of the aircraft 200.

The coil unit 150 may further include a coil support member 155 supporting a plurality of coils 151. For example, the plurality of coils 151 may be coupled to the coil support member 155 and may be coupled to a position that can be aligned with the plurality of permanent magnets 251.

Among the plurality of coils 151, a central coil 152 corresponding to the central magnet 252 may be disposed in a center of the coil support member 155. At least a portion of the coil support member 155 may be coupled to the take-off and landing portion 131 of the elevating device 130 in a state in which the plurality of coils 151 are coupled. However, a structure of the coil unit 150 is not particularly limited, and according to various embodiments, the plurality of coils 151 may be directly coupled to the take-off and landing portion 131.

The aircraft 200 that takes off and lands on the vertiport 100 may be provided with the magnet unit 250 corresponding to the coil unit 150 provided in the elevating device 130.

The aircraft 200 may include a fuselage 210 (or an airframe) capable of boarding passengers and/or loading cargo and a wing 230 coupled to an upper portion of the fuselage 210 and provided with a rotor generating lift.

The magnet unit 250 may be provided in a lower portion of the fuselage 210. For example, when the aircraft 200 lands on the take-off and landing portion 131, the magnet unit 250 may be disposed on a bottom surface of the lower portion of the fuselage 210 so as to face the coil unit 150 of the take-off and landing portion 131. Although not illustrated, the aircraft 200 may include a plurality of landing gears coupled to the lower portion of the fuselage 210 and supporting take-off, landing, and ground driving of the aircraft 200. The magnet unit 250 may be disposed in the lower portion of the fuselage 210 in a position in which interference with the plurality of landing gears does not occur.

The magnet unit 250 may include the plurality of permanent magnets 251. The plurality of permanent magnets 251 may include the central magnet 252 disposed in the center of the magnet unit 250 and the peripheral magnet 253 surrounding the central magnet 252. The central magnet 252 may correspond to the central coil 152 of the coil unit 150, and the peripheral magnet 253 may correspond to the peripheral coil 153 of the coil unit 150.

The central magnet 252 may be disposed to face a direction in which an electrode of one of an N pole and an S pole faces the coil unit 150. For example, one surface or one portion of the central magnet 252 facing the coil unit 150 may have an N pole or an S pole. When a direction in which the aircraft 200 lands is a first direction (①), and a direction in which the aircraft 200 takes off is a second direction (②), the central magnet 252 may be disposed so that the N pole faces the first direction (①) and the S pole faces the second direction (②), or the S pole faces the first direction (①) and the N pole faces the second direction (②).

The peripheral magnet 253 may be provided in a form in which a plurality of magnets are disposed in a circumferential direction to surround the central magnet 252. For example, the plurality of magnets of the peripheral magnet 253 may be disposed in a circular shape. The plurality of magnets of the peripheral magnet 253 may be arranged so that the N pole and the S pole alternately face the coil unit 150.

For example, when the peripheral magnet 253 includes n magnets, a first magnet 253*a*, a second magnet 253*b*, a third magnet 253*c*, and a fourth magnet 253*d* to an nth magnet may be sequentially disposed in the circumferential direction. In this case, the n magnets may be disposed in a pattern in which an N pole of the first magnet 253*a* faces the coil unit 150, an S pole of the second magnet 253*b* faces the coil unit 150, an N pole of the third magnet 253*c* faces the coil unit 150, and an S pole of the fourth magnet 253*d* faces the coil unit 150, so that adjacent magnets, among the peripheral magnets 253, may form magnetic fields having different directions in a direction facing the coil unit 150.

The magnet unit 250 may further include the magnet support member 255 supporting the plurality of permanent magnets 251. For example, the plurality of permanent magnets 251 may be coupled to the magnetic support member 255 and may be coupled to a position that can be aligned with the plurality of coils 151. The central magnet 252 may be disposed in a center of the magnet support member 255. At least a portion of the magnetic support member 255 may be coupled to the fuselage 210 (e.g., a bottom surface of the fuselage 210) of the aircraft 200 in a state in which the plurality of permanent magnets 251 are coupled. However, the structure of the magnet unit 250 is not particularly limited, and according to various embodiments, the plurality of permanent magnets 251 may be directly coupled to the fuselage 210.

The magnet unit 250 is not limited to the shape illustrated in FIG. 3 and may be modified in various manners.

Referring to FIG. 4, the magnet unit 250 may have various variations in the number and an arrangement gap of the peripheral magnets 253 based on a shape in which the peripheral magnet 253 surrounds the central magnet 252 disposed in the center of the magnet support member 255. Additionally, in the central magnet 252, a direction in which both poles face may be changed. The coil unit 150 may be modified in response to various shapes of the magnet unit 250.

Meanwhile, the peripheral magnet 253 in which both poles are alternately disposed is one of the preferred embodiments of the present disclosure, and according to various embodiments, the peripheral magnet 253, like the central magnet 252, may be disposed to face a direction in which an electrode of one of an N pole and an S pole faces the coil unit 150. For example, the peripheral magnet 253 may be disposed so that the N pole faces the first direction (①) and the S pole faces the second direction (②), or it may be disposed so that the S pole faces the first direction (①), and the N pole faces the second direction (②).

Additionally, the shape of the peripheral magnet 253 is not limited to the illustrated embodiment. According to various embodiments, the peripheral magnet 253 may be provided in a shape in which both poles are alternately disposed in one direction, by forming a plurality of magnets integrated rather than in a separate shape.

Although not illustrated, the elevating device 130 may further include a fastening structure that is fastened to the aircraft 200 when the aircraft 200 lands and secures the aircraft 200. For example, the fastening structure may be provided in the take-off and landing portion 131, and as the aircraft 200 lands on the take-off and landing portion 131, the fastening structure may be mechanically or physically fastened to a structure provided in the aircraft 200, thus stably fixing the aircraft 200. When the aircraft 200 takes off, the fastening structure may be disengaged from the aircraft 200. The aircraft 200 may be provided with a structure engaged or connected to the fastening structure in response to the fastening structure of the take-off and landing portion 131.

The fastening structure may operate based on a control signal from the controller 170. The fastening structure may have a charging function for charging the aircraft 200. The vertiport 100 may be configured to charge the aircraft 200 through the fastening structure in a state in which the fastening structure is fastened to the aircraft 200. For example, the vertiport 100 may be equipped with a charging unit configured to supply power to the aircraft 200 in the main body 110 or the elevating device 130, and the charging unit may be electrically connected to the aircraft 200 through the fastening structure and may charge the aircraft 200.

The fastening structure may be provided in a position in which interference with the coil unit 150 does not occur. The position of the fastening structure is not particularly limited, and the fastening structure may be installed in a position fastened to the aircraft 200 to provide a fixing force to the aircraft 200 in a state in which the aircraft 200 is settled on the take-off and landing portion 131 due to an attractive force between the coil unit 150 and the magnet unit 250. The fastening structure may include a rotational fastening structure, a sliding fastening structure, and a docking structure, but is not limited thereto, and various types of mechanical/physical fastening structures may be applied to the fastening structure.

The controller 170 may control an overall operation and driving of the vertiport 100. The controller 170 may be provided in the main body 110 and/or the elevating device 130. The controller 170 may control elevating and lowering of the elevating device 130. For example, the controller 170 may generate an elevating signal or a lowering signal and transmit the signal to the elevating device 130 (or a drive configured to drive the elevating device 130).

The controller 170 may apply current to the coil unit 150 provided in the take-off and landing portion 131, and the controller 170 may control a direction and intensity of the applied current. For example, the controller 170 may determine the direction and intensity of the current based on the type of force (e.g., a repulsive force or an attractive force) and a magnitude of force required between the aircraft 200 and the take-off and landing portion 131, and the controller 170 may apply the direction and intensity of the current to the plurality of coils 151. The controller 170 may individually control the direction and intensity of the current applied to each of the plurality of coils 151.

The controller 170 may receive information on an external situation from a control unit (not illustrated) or a sensing unit (not illustrated) provided in the vertiport 100, and based on the information, the controller 170 may control the intensity of the current to adjust the magnitude of the repulsive force or the attractive force applied to the aircraft 200. For example, the information on the external situation may include factors that may affect an alignment and landing of the aircraft 200, such as the strength and direction of the wind, the strength of a rotor 231 provided in the aircraft 200, and the like.

Hereinafter, based on an electromagnetic interaction between a plurality of coils 151 and a plurality of permanent magnets 251, a configuration that provides alignment, fixation, and an impact alleviating effect of the aircraft 200 when the aircraft 200 lands will be described.

The vertiport 100 according to an embodiment of the present disclosure may be configured to generate an attractive force and/or a repulsive force between the aircraft 200 and the take-off and landing portion 131 by an electromagnetic force of the plurality of coils 151 and the plurality of permanent magnets 251.

The vertiport 100 may generate a force for pulling the aircraft 200 to the take-off and landing portion 131 and a force for pushing the aircraft 200 from the take-off and landing portion 131, respectively or simultaneously, by utilizing the electromagnetic interaction of the coil unit 150 and the magnet unit 250. Such force may align the aircraft 200 in a given position in the process of landing on the take-off and landing portion 131 and may reduce impacts acting on the aircraft 200 when the aircraft 200 is settled on and in contact with the take-off and landing portion 131.

When current flows through the plurality of coils 151 of the coil unit 150, a magnetic field is formed and a direction of the magnetic field may be determined according to a direction of the current (e.g., Ampere's right-handed screw rule). This magnetic field exerts magnetic force on the plurality of permanent magnets 251 of the magnet unit 250. An electromagnetic force (e.g., an attractive force) directed in a first direction (①) approaching the coil unit 150 by the magnetic field formed in the plurality of coils 151, or an electromagnetic force (e.g., a repulsive force) in a second direction (②) moving away from the coil unit 150 may act on at least some of the plurality of permanent magnets 251.

Referring to the central magnet 252 and the central coil 152 illustrated in FIG. 3 as an example, when current flows counterclockwise in the central coil 152, the central coil 152 is provided so that the second direction (②) has an N pole and the first direction (①) has an S pole, and the central magnet 252 in which the S pole is arranged in the first direction (①) exerts an attractive force by the central coil 152.

Conversely, when current flows clockwise in the central coil 152, the central coil 152 is provided so that the second direction (②) has an S pole and the first direction (①) has an N pole, and the central magnet 252 in which the S pole is arranged in the first direction (①) exerts a repulsive force by the central coil 152. The controller 170 may change a direction of the current flowing through the plurality of coils 151 as described above, thus controlling the repulsive force or the attractive force to act on the plurality of permanent magnets 251.

The coil unit 150 and the magnet unit 250 may be controlled so that only an attractive force, only a repulsive force, or both an attractive force and a repulsive force act therebetween. For example, the controller 170 may control the direction of the current flowing in the plurality of coils 151 so that the repulsive force acts between all the plurality of coils 151 and the plurality of permanent magnets 251. Alternatively, the controller 170 may control the direction of the current flowing in the plurality of coils 151 so that the attractive force acts between all the plurality of coils 151 and the plurality of permanent magnets 251. Alternatively, the controller 170 may control the direction of current flowing through the plurality of coils 151 so that the repulsive force acts between some of the plurality of coils 151 and some magnets corresponding to some coils, among the plurality of permanent magnets 251, and the attractive force acts between the other coils of the plurality of coils 151 and the remaining magnets corresponding to the other coils, among the plurality of permanent magnets 251.

Referring to the coil unit 150 and the magnet unit 250 illustrated in FIG. 3 as an example, the controller 170 may apply current to the central coil 152 so that an attractive force acts between the central coil 152 and the central magnet 252, may apply current to a first coil 153*a* and a third coil 153*c* so that a repulsive force acts between the first magnet 253*a* and the first coil 153*a* and between the third magnet 253*c* and the third coil 153*c*, and may apply current to a second coil 153*b* and a fourth coil 153*d* so that a repulsive force acts between the second magnet 253*b* and the second coil 153*b* and between the fourth magnet 253*d* and the fourth coil 153*d*. Furthermore, for example, the controller 170 may control the current applied to the plurality of coils 151 so that the attractive force acts between the central coil 152 and the central magnet 252 and the repulsive force acts on all peripheral magnets 253 and coils corresponding thereto.

The controller 170 may control the attractive force and the repulsive force to act simultaneously between the coil unit 150 and the magnet unit 250, but either the repulsive force or the attractive force acts more dominantly. For example, the controller 170 may control the number of pairs of the plurality of coils 151 and the plurality of permanent magnets 251 to which the repulsive force acts to be more than the number of pairs of the plurality of coils 151 and the plurality of permanent magnets 251 to which the attractive force acts, and thus, both the attractive force and the repulsive force act, but the repulsive force acts dominantly as a whole, so that the aircraft 200 may be maintained in a state of pushing the aircraft 200 from the take-off and landing portion 131. Conversely, the controller 170 may control the number of pairs of the plurality of coils 151 and the plurality of permanent magnets 251 to which the attractive force acts to be more than the number of the pairs of the plurality of coils 151 and the plurality of permanent magnets 251 to which the repulsive force acts, and both the attractive force and the repulsive force act, but the attractive force acts dominantly as a whole, so that the aircraft 200 may be maintained in a state of pulling the aircraft 200 to the take-off and landing portion 131.

When the attractive force and the repulsive force act simultaneously between the coil unit 150 and the magnet unit 250, the attractive force acts to align the aircraft 200 to a landing position of the take-off and landing portion 131, and the repulsive force acts to alleviate impacts acting on the aircraft 200 when the aircraft 200 lands.

A method of landing an aircraft 200 using the electromagnetic interaction between the coil unit 150 and the magnet unit 250 will be described in more detail with reference to FIG. 5 below.

Figure 5:
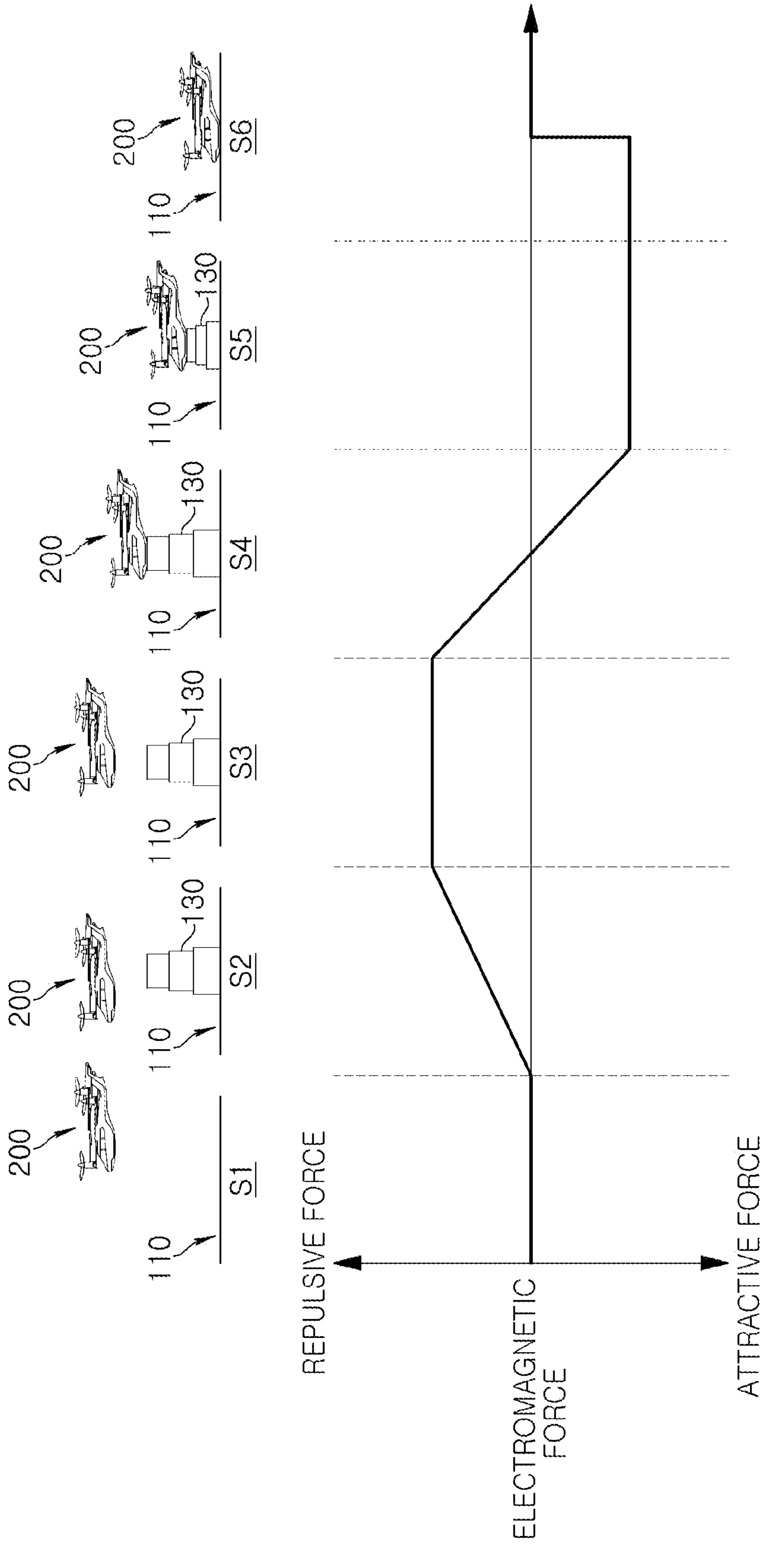
FIG. 5 illustrates an operation in which an aircraft lands on a vertiport according to an embodiment of the present disclosure.

FIG. 5 illustrates an operation of the aircraft 200 landing on the vertiport 100 according to an embodiment of the present disclosure.

FIG. 5 describes a method for landing the aircraft 200 on the vertiport 100 described with reference to FIGS. 1 to 4, and hereinafter, in describing FIG. 5, FIGS. 1 to 4 will be referred to together, and redundant description thereof will be omitted hereinafter.

An upper side of FIG. 5 illustrates a process of landing the aircraft 200 in each operation, and a bottom side of FIG. 5 illustrates a graph representing a change in the electromagnetic force acting between the magnet unit 250 of the aircraft 200 and the coil unit 150 of the vertiport 100 in each operation of a landing process of the aircraft 200.

In the graph illustrated in FIG. 5, the electromagnetic force denotes a resultant force of the electromagnetic force acting between a plurality of permanent magnets 251 of the magnet unit 250 and a plurality of coils 151 of the coil unit 150 as a whole, that is, a net force.

For example, when the repulsive force is applied between the magnet unit 250 and the elevating device 130, the resultant force of all the force (a repulsive force and/or an attractive force) generated between each of the plurality of coils 151 and the plurality of permanent magnets 251 is a repulsive force, which means that even if the attractive force occurs between some coils and some permanent magnets, the repulsive force is higher or dominant. Conversely, when the attractive force acts between the magnet unit 250 and the elevating device 130, the resultant force of all the force generated between each of the plurality of coils 151 and the plurality of permanent magnets 251 is an attractive force, which means that even if the repulsive force occurs between some coils and some permanent magnets, the attractive force is higher or dominant. In other words, even if the electromagnetic force acts as a repulsive or an attractive force in the graph, it is not necessary that the repulsive force or the attractive force be generated between all of the plurality of coils 151 and the plurality of permanent magnets 251.

Referring to FIG. 5, a method for landing the aircraft 200 on the vertiport 100 according to an embodiment may include an operation in which an aircraft approaches (S1), an operation of elevating an elevating device (S2), an operation of aligning the aircraft using an electromagnetic force (S3), an operation of settling and fastening the aircraft to the take-off and landing portion (S4), an operation of lowering the elevating device (S5), and an operation of landing the aircraft on a main body (S6).

In the operation in which an aircraft approaches (S1), the aircraft 200 approaches the vertiport 100 to land on the vertiport 100. In operation S1, no current is applied to the plurality of coils 151 and no electromagnetic force is generated.

In the operation of elevating an elevating device (S2), the aircraft 200 flies stationary (e.g., hovering) at the top of the vertiport 100, and the vertiport 100 elevates the take-off and landing portion 131, so that the controller 170 may generate or activate an electromagnetic force between the magnet unit 250 and the coil unit 150.

In operation S2, the elevating device 130 is elevated under the control of the controller 170 to position the take-off and landing portion 131 to be higher than the main body 110 by a predetermined height. As the take-off and landing portion 131 is disposed to be higher than the main body 110, an influence of a vortex generated by the rotor 231 of the aircraft 200 may be reduced, from which alignment and settling of the aircraft 200 may be more easily performed during the landing process.

In operation S2, the controller 170 controls a current to be applied to the plurality of coils 151 so that an electromagnetic force between the magnet unit 250 of the aircraft 200 and the coil unit 150 of the take-off and landing portion 131 acts as a repulsive force. Here, the repulsive force acting between the magnet unit 250 and the elevating device 130 is a resultant force of all the force (i.e., a repulsive force and/or an attractive force) acting between each of the plurality of coils 151 and the plurality of permanent magnets 251, and may be a state in which the attractive force may be acting between some of the plurality of coils 151 and the plurality of permanent magnets 251.

In operation S2, the controller 170 may individually control a direction in which the current is applied to each of the plurality of coils 151 and the intensity of the current. Additionally, the controller 170 may control the current applied to the plurality of coils 151 so that the repulsive force between the coil unit 150 and the magnet unit 250 increases linearly to a predetermined size. However, the repulsive force is not necessarily limited to increasing linearly.

In the operation of aligning the aircraft using electromagnetic force (S3), the aircraft 200 may be aligned on top of a landing position of the take-off and landing portion 131 based on the attractive force acting on some of the plurality of coils 151 and the plurality of permanent magnets 251. The controller 170 may control the current applied to the plurality of coils 151 so that the repulsive force between the coil unit 150 and the magnet unit 250 is maintained on a constant level.

In operation S3, the controller 170 may control the current applied to the plurality of coils 151 so that the resultant force of the electromagnetic force acting between the magnet unit 250 and the coil unit 150 is maintained as the repulsive force, but the attractive force acts between the central magnet 252 and the central coil 152 and/or between a portion of the peripheral magnet 253 and a portion of the peripheral coil 153. The aircraft 200 is aligned to a position to be settled on an upper portion of the take-off and landing portion 131 by the attractive force between some coils and some permanent magnets in a state in which the aircraft 200 maintains a separation from the take-off and landing portion 131 by the repulsive force between the magnet unit 250 and the coil unit 150.

In the operation of settling and fastening the aircraft to the take-off and landing portion (S4), as the electromagnetic force between the magnet unit 250 and the coil unit 150 is converted from the repulsive force to the attractive force, the aircraft 200 may be pulled to the elevating device 130 and settled on the take-off and landing portion 131, and it may be fastened to a fastening structure provided on the take-off and landing portion 131 while being settled on the take-off and landing portion 131. The aircraft 200 may be charged simultaneously with being fastened to the fastening structure.

In operation S4, the controller 170 may control the current applied to the plurality of coils 151 so that the resultant force of the electromagnetic force acting between the magnet unit 250 and the coil unit 150 is converted from the repulsive force to the attractive force. The controller 170 may control the magnitude of the repulsive force to decrease linearly and the magnitude of the attractive force to increase linearly, but the magnitude of the repulsive force and the attractive force are not necessarily limited to changing linearly.

In the operation of lowering the elevating device (S5), the aircraft 200 is fixed to the take-off and landing portion 131 by the attractive force acting between the magnet unit 250 and the coil unit 150 and the mechanical fastening of a fastening means, and the vertiport 100 may lower the elevating device 130. For example, the elevating device 130 descends under the control of the controller 170 so as to position the take-off and landing portion 131 and the aircraft 200 on the main body 110. The aircraft 200 may be turned off before the elevating device 130 descends (or after being fastened to the fastening structure in operation S4).

In operation S5, the controller 170 controls the current applied to the plurality of coils 151 so that the resultant force of the electromagnetic force acting between the magnet unit 250 and the coil unit 150 maintains a constant size of attractive force. The aircraft 200 is primarily fixed by the electromagnetic force (i.e., the attractive force) between the magnet unit 250 and the coil unit 150 and is secondarily fixed by the fastening means, so that the aircraft 200 may be stably fixed to the take-off and landing portion 131.

In the operation of landing the aircraft on a main body (S6), the descent of the elevating device 130 is completed and the aircraft 200 lands on the vertiport 100. For example, when the descent of the elevating device 130 and the landing of the aircraft 200 are completed, passengers on board the aircraft 200 are disembarked and/or cargo loaded on the aircraft 200 is unloaded.

In operation S6, until the descent of the elevating device 130 and the landing of the aircraft 200 are completed, a certain amount of attractive force acts between the magnet unit 250 and the coil unit 150, and when the landing of the aircraft 200 is completed, the controller 170 controls the current applied to the plurality of coils 151 so that the electromagnetic force is removed or deactivated.

Although various embodiments of the disclosed technology have been described in detail above, the scope of the disclosed technology is not limited thereto, and it will be apparent to those skilled in the art that modifications and variations could be made without departing from the scope of the disclosed technology as defined by the appended claims.

In addition, some components may be deleted and implemented in the above-described example embodiments, and each of the embodiments may be combined and implemented with each other.

What is claimed is:

1. A vertiport comprising:

a main body;

an elevating device that is movable up and down with respect to the main body;

a take-off and landing portion disposed on an upper portion of the elevating device, wherein the take-off and landing portion is configured to operate to allow an aircraft equipped with a magnet unit in a lower portion of a fuselage to take off, land, and move; and a coil unit disposed in the take-off and landing portion and configured to interact electromagnetically with the magnet unit of the aircraft, the coil unit comprising a plurality of coils including a central coil disposed in a center of the coil unit and a peripheral coil surrounding the central coil, wherein the peripheral coil comprises a plurality of electromagnetic coils disposed in a circular shape and surrounding the central coil.

2. The vertiport according to claim 1, wherein:

the magnet unit comprises a plurality of permanent magnets; and the plurality of coils is disposed in a position corresponding to the plurality of permanent magnets.

3. The vertiport according to claim 2, wherein:

the plurality of permanent magnets comprises a central magnet disposed in a center of the magnet unit and a peripheral magnet surrounding the central magnet;

the central coil corresponds to the central magnet; and the peripheral coil corresponds to the peripheral magnet.

4. The vertiport according to claim 3, wherein:

the coil unit further comprises a coil support member to which the plurality of coils is coupled; and the central coil is disposed in a center of the coil support member.

5. The vertiport according to claim 3, wherein the peripheral magnet comprises a plurality of magnets disposed in the circular shape and surrounding the central magnet in a configuration matching the plurality of electromagnetic coils.

6. The vertiport according to claim 1, wherein in a state in which a process of landing the aircraft on the take-off and landing portion is being performed, the coil unit is disposed to face the magnet unit disposed in the lower portion of the fuselage and an electromagnetic force acts between the coil unit and the magnet unit.

7. The vertiport according to claim 1, further comprising a fastening structure disposed on the take-off and landing portion and mechanically fastened to the aircraft, wherein the aircraft is capable of being charged through fastening with the fastening structure.

8. A vertiport comprising:

a main body;

an elevating device configured to move up and down with respect to the main body;

a take-off and landing portion disposed on an upper portion of the elevating device, wherein:

the take-off and landing portion is configured to operate to allow an aircraft equipped with a magnet unit in a lower portion of a fuselage to take off, land, and move;

the magnet unit comprises a plurality of permanent magnets; and the plurality of permanent magnets comprises a central magnet disposed in a center of the magnet unit and a peripheral magnet surrounding the central magnet;

a coil unit disposed in the take-off and landing portion and configured to interact electromagnetically with the magnet unit of the aircraft, wherein:

the coil unit comprises a plurality of coils disposed in a position corresponding to the plurality of permanent magnets; and the plurality of coils comprises a central coil disposed in a center of the coil unit and corresponding to the central magnet and a peripheral coil surrounding the central coil and corresponding to the peripheral magnet, wherein the peripheral coil comprises a plurality of electromagnetic coils disposed in a circular shape and surrounding the central coil; and a controller disposed in the elevating device and configured to apply a current to the plurality of coils, wherein the controller is configured to control a direction and an intensity of the current flowing through the plurality of coils.

9. The vertiport according to claim 8, wherein:

a repulsive force or an attractive force is generated between each of the plurality of coils and the plurality of permanent magnets corresponding to each other based on the direction of the current flowing through the plurality of coils; and a net force of the attractive force and the repulsive force generated between each of the plurality of coils and the plurality of permanent magnets acts between the coil unit of the take-off and landing portion and the magnet unit of the aircraft.

10. The vertiport according to claim 9, wherein the controller is configured to control the current applied to the plurality of coils so that the attractive force is generated between a first subset of the plurality of coils and the plurality of permanent magnets corresponding to each other and the repulsive force is generated between a second subset of the plurality of coils and the plurality of permanent magnets corresponding to each other.

11. The vertiport according to claim 10, wherein based on the attractive force generated between the first subset of the plurality of coils and the plurality of permanent magnets, the aircraft is configured to be aligned with an upper portion of a landing position of the take-off and landing portion.

12. The vertiport according to claim 10, wherein based on the repulsive force generated between the second subset of the plurality of coils and the plurality of permanent magnets, impacts applied to the aircraft are absorbed in a process of settling the aircraft on the take-off and landing portion.

13. The vertiport according to claim 10, wherein the controller is configured to apply the current so that the attractive force is generated between the central coil and the central magnet and the repulsive force is generated between a portion of the peripheral coil and a portion of the peripheral magnet.

14. The vertiport according to claim 8, wherein the controller is configured to apply the current so that in a state in which the aircraft is aligned with a landing position of the take-off and landing portion, a net force of an electromagnetic force acting between the coil unit and the magnet unit is converted from a repulsive force to an attractive force and the aircraft is settled in the take-off and landing portion by the attractive force.

15. A vertiport comprising:

a main body;

an elevating device configured to move up and down with respect to the main body;

a take-off and landing portion disposed on an upper portion of the elevating device, wherein:

the take-off and landing portion is configured to operate to allow an aircraft equipped with a magnet unit in a lower portion of a fuselage to take off, land, and move;

the magnet unit comprises a plurality of permanent magnets; and the plurality of permanent magnets comprises a central magnet disposed in a center of the magnet unit and a peripheral magnet surrounding the central magnet;

a coil unit disposed in the take-off and landing portion and configured to interact electromagnetically with the magnet unit of the aircraft, wherein:

the coil unit comprises a plurality of coils disposed in a position corresponding to the plurality of permanent magnets; and the plurality of coils comprises a central coil disposed in a center of the coil unit and corresponding to the central magnet and a peripheral coil surrounding the central coil and corresponding to the peripheral magnet; and a controller disposed in the elevating device and configured to apply a current to the plurality of coils, wherein the controller is configured to control a direction and an intensity of the current flowing through the plurality of coils;

wherein a repulsive force or an attractive force is generated between each of the plurality of coils and the plurality of permanent magnets corresponding to each other based on the direction of the current flowing through the plurality of coils;

wherein a net force of the attractive force and the repulsive force generated between each of the plurality of coils and the plurality of permanent magnets acts between the coil unit of the take-off and landing portion and the magnet unit of the aircraft; and wherein the controller is configured to control the current applied to the plurality of coils so that the attractive force is generated between a first subset of the plurality of coils and the plurality of permanent magnets corresponding to each other and the repulsive force is generated between a second subset of the plurality of coils and the plurality of permanent magnets corresponding to each other.

16. The vertiport according to claim 15, wherein based on the attractive force generated between the first subset of the plurality of coils and the plurality of permanent magnets, the aircraft is configured to be aligned with an upper portion of a landing position of the take-off and landing portion.

17. The vertiport according to claim 15, wherein based on the repulsive force generated between the second subset of the plurality of coils and the plurality of permanent magnets, impacts applied to the aircraft are absorbed in a process of settling the aircraft on the take-off and landing portion.

18. The vertiport according to claim 15, wherein the controller is configured to apply the current so that the attractive force is generated between the central coil and the central magnet and the repulsive force is generated between a portion of the peripheral coil and a portion of the peripheral magnet.

19. The vertiport according to claim 15, wherein the controller is configured to apply the current so that in a state in which the aircraft is aligned with a landing position of the take-off and landing portion, a net force of an electromagnetic force acting between the coil unit and the magnet unit is converted from a repulsive force to an attractive force and the aircraft is settled in the take-off and landing portion by the attractive force.

* * * * *